March 4, 1941.　　　E. C. BALLMAN　　　2,233,880
VERTICAL BEARING
Original Filed June 29, 1936
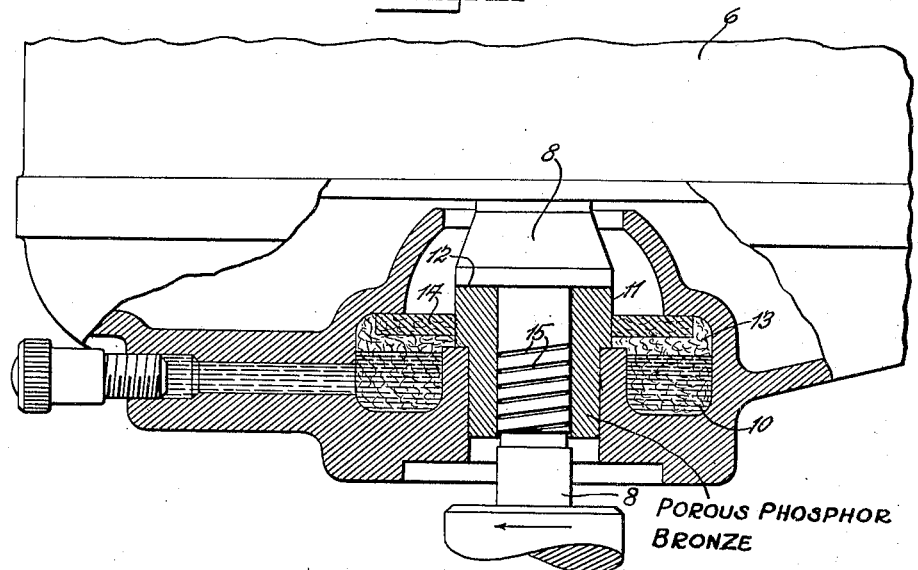
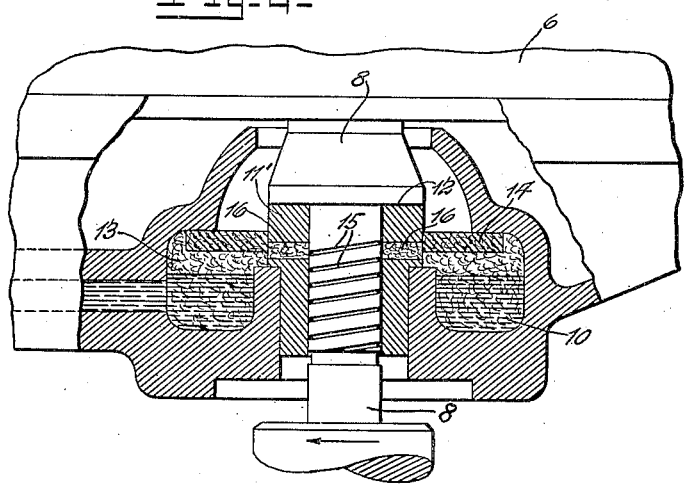
INVENTOR.
EDWIN C. BALLMAN
BY Brunniga & Sutherland,
HIS ATTORNEYS.

Patented Mar. 4, 1941

2,233,880

UNITED STATES PATENT OFFICE 2,233,880

VERTICAL BEARING

Edwin C. Ballman, St. Louis, Mo.

Original application June 29, 1936, Serial No. 87,857. Divided and this application January 27, 1938, Serial No. 187,109

2 Claims. (Cl. 308—134.1)

This invention relates to shaft bearings and more particularly to bearings for a vertical shaft and to means for lubricating the same.

In some types of apparatus having a rotating shaft mounted in an upstanding position, for example in a ceiling fan which rotates on a vertical axis, it is desirable to employ sleeve bearings for the sake of noiseless operation. When sleeve bearings are used in a vertical position, however, difficulty is often encountered due to the fact that oil tends to leak out of the bearing, and in many cases the capillary space between the shaft and the bearing sets up a siphon action tending to siphon the oil out of the oil reservoir with which such a bearing is usually provided.

One of the objects of this invention, therefore, is to provide a bearing structure for such upstanding shafts which will be free from such tendency to leak oil.

Another object is to provide an improved sleeve bearing construction for a vertical shaft which will be properly self-lubricating.

Another object is to provide such a bearing and shaft construction in which provision is made for continuously feeding lubricant to the bearing while at the same time positively preventing the lubricant so fed from leaking out of the bearing.

Further objects will appear from the following description taken in connection with the accompanying drawing in which Figure 1 is a detail sectional view of a vertical thrust bearing embodying this invention and Figure 2 is a similar view illustrating another embodiment of the invention.

This application is a division of my co-pending application Serial Number 87,857, filed June 29, 1936.

The above-mentioned co-pending application discloses a combination lighting and air conditioning fixture in which is embodied a fan rotating on a vertical axis and equipped with bearings such as disclosed herein.

The device disclosed in the above-mentioned co-pending application involves a fan motor 6. This motor has a vertical shaft 8 to the lower end of which a fan is attached, not shown in the accompanying drawing. The direction of rotation of the shaft 8 is as indicated by the arrow in each figure. The shaft 8 of the motor is in a vertical position. It is preferable to provide such a motor with sleeve bearings in order to insure quiet running and for the sake of other advantages. It has been found heretofore, however, that it is very difficult to provide proper lubrication for a sleeve bearing for a vertical shaft without danger of leaking oil from the bearing. The clearance space between the shaft and the bearing sleeve is of capillary dimensions, and, if placed in communication with an oil reservoir, usually provides a capillary siphon which draws oil out of the reservoir, and as the lower end of the sleeve must be open, the oil usually leaks out at the bottom of the sleeve.

In accordance with this invention a housing for the bearing is provided which has formed therein an oil reservoir 10. This housing also supports a bearing sleeve 11 which has an inner bearing surface for the journal of the shaft 8 and also a top shoulder adapted to receive the thrust shoulder 12 of the shaft 8. The sleeve 11 may be constructed of porous material such as compressed porous phosphor bronze. This provides a good bearing material and at the same time is sufficiently porous to permit the transmission of lubricant through the body thereof.

The reservoir 10 is packed with wool 13 and is closed at the top by a washer 14 of felt or other porous material. The wool packing 13 and also the porous washer 14 quickly become saturated with oil by capillary action. Both the wool and the washer 14 are arranged so as to contact with the porous sleeve 11. By such contact the oil held in the wool and the felt is transmitted to the porous structure of the sleeve 11 which by capillary action transmits the same therethrough to the inner bearing surface where the lubricant serves to lubricate the journal of the shaft 8 and is also carried to the thrust shoulder 12.

It will be noted that the inner rim of the reservoir 10 provides an impervious barrier between the reservoir and the shaft which extends above the liquid level in the reservoir, so that there is no path for direct leakage by gravity from the reservoir to the shaft. In fact, no oil can get to the shaft from the reservoir except by way of the capillary devices which carry it over this barrier.

In order to prevent the leakage of oil from the sleeve 11 the journal portion of the shaft 8 is provided with a helical groove 15. This groove is cut in such a direction that with the rotation of the shaft as indicated by the arrow the movement of this groove will operate as a pump to carry upwardly the oil which is fed by capillary action to the inner bearing of the sleeve 11. This oil is carried upwardly along the bearing surface and not only is distributed along that surface but operates to force the oil more positively to the upper extremity of the sleeve 11 so as to lubricate the thrust shoulder 12. Thus, while the motor is running, the tendency in the groove 15 is continually to counteract the tendency for a downward flow of oil in the capillary space between the shaft and the sleeve 11. Furthermore, the groove 15 is made sufficiently large so as to be non-capillary. Accordingly, when the motor is stopped, air will penetrate into this groove and be carried into the capillary space between the shaft and the sleeve. As this groove is carried to a point above the maximum level of the oil in the reservoir 10, it serves to break any siphon action which may tend to start at this point. By this arrangement the atmospheric pressure is brought to the inner surface of the sleeve 11 and accordingly, while the porosity of the sleeve tends by capillary action to provide a continual supply of lubricant at the inner surface of the bearing, the capillary action from that point on is destroyed by the presence of atmospheric pressure and accordingly all tendency for the bearing to leak is prevented.

In the embodiment of Figure 2 the sleeve 11' may be made of ordinary bearing metal, non-porous, and may be perforated at suitable intervals by transverse passages 16 into which the wool packing 13 is carried. The capillary feed of oil from the reservoir is carried through these passages to the inner surface of the bearing. In this case the groove 15 is carried up to and preferably above the passage 16.

It will be noted that the groove 15 is carried upwardly from the lower end of the bearing sleeve, and also that this groove has a comparatively small pitch so as to provide numerous gaps in the capillary space between the shaft and the bearing. Since capillary action is due to the surface tension of the liquid and its ability to wet the surfaces of the capillary passage, the introduction of these gaps breaks the continuity of the capillary film and introduces atmospheric pressure at numerous points. Accordingly, each section of capillary film is short and has an atmospheric gap above and below it to counteract any tendency of the film to move downwardly.

While this device has been described as embodying a unitary device, it will be understood that individual features or sub-combinations thereof may be useful by themselves without reference to other features or the entire combination, and it is understood, that the employment of such individual features or sub-combinations is contemplated by this invention and within the scope of the appended claims.

It is further obvious that various changes in the details of construction may be made within the scope of the appended claims without departing from the spirit of this invention. It is understood, therefore, that the invention is not limited to the specific details shown or described.

Having thus described the invention, what is claimed is:

1. In a device of the character described having an upright shaft, a lubricant reservoir having an impervious barrier between it and said shaft, said barrier extending above the liquid level in said reservoir, a sleeve bearing for said shaft having means adapted to carry lubricant to said shaft, capillary means for carrying lubricant from said reservoir to said sleeve over said barrier, and means below the top of said barrier providing a non-capillary passage open to the atmosphere and to the space between said sleeve and said shaft at closely spaced points therealong in order to break siphonic action in said space.

2. In a device of the character described having an upright shaft, a lubricant reservoir having an impervious barrier between it and said shaft, said barrier extending above the liquid level in said reservoir, a porous sleeve bearing for said shaft adapted to carry lubricant through its pores to said shaft, a capillary packing in said reservoir providing capillary communication between lubricant therein and said porous sleeve over the top of said barrier, and means below the top of said barrier providing a non-capillary passage open to the atmosphere and to the space between said sleeve and said shaft at closely spaced points therealong in order to break siphonic action in said space.

EDWIN C. BALLMAN.